(12) United States Patent
Nishimura

(10) Patent No.: US 12,412,396 B2
(45) Date of Patent: Sep. 9, 2025

(54) FLOW LINE DISPLAY APPARATUS, FLOW LINE DISPLAY METHOD, AND NON-TRANSITORY COMPUTER-READABLE STORAGE MEDIUM

(71) Applicant: NEC Corporation, Tokyo (JP)

(72) Inventor: Shoji Nishimura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 380 days.

(21) Appl. No.: 17/925,660

(22) PCT Filed: May 25, 2020

(86) PCT No.: PCT/JP2020/020483
§ 371 (c)(1),
(2) Date: Nov. 16, 2022

(87) PCT Pub. No.: WO2021/240581
PCT Pub. Date: Dec. 2, 2021

(65) Prior Publication Data
US 2023/0186635 A1    Jun. 15, 2023

(51) Int. Cl.
*G06V 20/52* (2022.01)
*G06F 3/0482* (2013.01)
*G06T 11/20* (2006.01)

(52) U.S. Cl.
CPC ............ *G06V 20/52* (2022.01); *G06F 3/0482* (2013.01); *G06T 11/203* (2013.01)

(58) Field of Classification Search
CPC ...... G06V 20/52; G06V 40/20; G06F 3/0482; G06T 11/203; G06T 11/20; G08B 13/19613; H04N 7/188; H04N 5/445
See application file for complete search history.

(56) References Cited

U.S. PATENT DOCUMENTS

2006/0200378 A1* 9/2006 Sorensen ............ G06Q 10/063
                                                    705/7.29
2009/0268028 A1   10/2009 Ikumi et al.
(Continued)

FOREIGN PATENT DOCUMENTS

JP   2009-265922 A    11/2009
JP   2009-284167 A    12/2009
(Continued)

OTHER PUBLICATIONS

Japanese Office Communication for JP Application No. 2024-061264 mailed on Dec. 17, 2024 with English Translation.
(Continued)

*Primary Examiner* — Iriana Cruz

(57) ABSTRACT

A flow line display apparatus (10) includes an acquisition unit (110) and a display processing unit (120). The acquisition unit (110) acquires at least one piece of flow line information. The flow line information includes a flow line of a person, and action information indicating an action
(Continued)

performed when the person moves along the flow line and a location where the action is performed. The flow line information is generated with respect to each person. The display processing unit (120) displays, on a display unit (130), a flow line indicated by flow line information, action content information indicating an action indicated by action information, and action location information indicating a location where the action is performed.

18 Claims, 11 Drawing Sheets

(56) References Cited

U.S. PATENT DOCUMENTS

| | | | |
|---|---|---|---|
| 2009/0319340 A1 | 12/2009 | Sekine et al. | |
| 2011/0199461 A1 | 8/2011 | Horio et al. | |
| 2013/0066448 A1* | 3/2013 | Alonso | H04Q 9/00 |
| | | | 700/91 |
| 2015/0016798 A1* | 1/2015 | Fujimatsu | G06V 20/52 |
| | | | 386/223 |
| 2015/0066551 A1* | 3/2015 | Harada | G06Q 10/06 |
| | | | 705/7.11 |
| 2015/0091944 A1 | 4/2015 | Matsumoto et al. | |
| 2015/0235237 A1* | 8/2015 | Shaw | H04W 64/00 |
| | | | 705/7.29 |
| 2016/0375340 A1* | 12/2016 | Monari | G09G 5/363 |
| | | | 345/474 |
| 2018/0115749 A1 | 4/2018 | Toshiyuki et al. | |

FOREIGN PATENT DOCUMENTS

| | | |
|---|---|---|
| JP | 2010-002997 A | 1/2010 |
| JP | 2014-191541 A | 10/2014 |
| JP | 2015-070354 A | 4/2015 |
| JP | 2016-129295 A | 7/2016 |
| JP | 2017-123026 A | 7/2017 |
| JP | 2018-105629 A | 7/2018 |
| JP | 2018-160219 A | 10/2018 |
| JP | WO2018/180039 A1 | 12/2019 |
| WO | 2010/044186 A1 | 4/2010 |
| WO | 2016/147770 A1 | 9/2016 |
| WO | 2018/079457 A1 | 5/2018 |

OTHER PUBLICATIONS

International Search Report for PCT Application No. PCT/JP2020/020483, mailed on Aug. 25. 2020.

JP Office Action for JP Application No. 2022-527264, mailed on Feb. 6, 2024 with English Translation.

* cited by examiner

FLOW LINE DISPLAY APPARATUS, FLOW LINE DISPLAY METHOD, AND NON-TRANSITORY COMPUTER-READABLE STORAGE MEDIUM

This application is a National Stage Entry of PCT/JP2020/020483 filed on May 25, 2020, the contents of all of which are incorporated herein by reference, in their entirety.

TECHNICAL FIELD

The present invention relates to a flow line display apparatus, a flow line display method, and a program.

BACKGROUND ART

In recent years, by using an image analysis or the like, recognizing a flow line of a person has been performed. Then, the acquired flow line is displayed on a display unit such as a display.

Patent Document 1, for example, describes forming a detection flag indicating whether a tracking target object can be detected from a captured image and determining, based on the detection flag, a display type of a flow line. Then, according to Patent Document 1, the flow line is displayed by being superimposed onto the captured image.

Further, Patent Document 2 describes the following technique. First, it is described that, based on an image analysis, a flow line of each of a plurality of persons in a surveillance region is determined, and the flow line is stored in a database in association with a flow line ID. The flow line ID is associated with a person ID. Then, when a certain person ID is selected, a flow line relevant to the person ID is read from the database, and the read flow line is displayed on a screen.

Further, Patent Document 3 describes that a flow line of a moving body is displayed on a real-time video in a superimposed manner.

Note that, Patent Document 4 describes that a person having performed a predetermined motion is detected by analyzing a video, the number of detections is stored with respect to each person, and by using the number of detections of the predetermined motion, the person is set as a suspect.

RELATED DOCUMENT

Patent Document

[Patent Document 1] International Publication No. WO2010/044186
[Patent Document 2] Japanese Patent Application Publication No. 2009-265922
[Patent Document 3] Japanese Patent Application Publication No. 2015-70354
[Patent Document 4] International Publication No. WO2016/147770

SUMMARY OF THE INVENTION

Technical Problem

A motion of a person is defined based on various types of information. The present inventor has studied that a motion of a person is displayed on a display unit in a recognizable manner. One of problems to be solved according to the present invention is to display a motion of a person on a display unit in a recognizable manner.

Solution to Problem

A flow line display apparatus according to an example aspect of the present invention includes:
an acquisition unit that acquires a flow line of a person, and flow line information including action information indicating an action performed when the person moves along the flow line and a location where the action is performed; and
a display control unit that displays, on a display unit, the flow line, action content information indicating a content of the action, and action location information indicating a location where the action is performed.

A flow line display method according to an example aspect of the present invention includes,
by a computer:
acquiring a flow line of a person, and flow line information including action information indicating an action performed when the person moves along the flow line and a location where the action is performed; and
displaying, on a display unit, the flow line, action content information indicating a content of the action, and action location information indicating a location where the action is performed.

A program according to an example aspect of the present invention causes a computer to include:
an acquisition function of acquiring a flow line of a person, and flow line information including action information indicating an action performed when the person moves along the flow line and a location where the action is performed; and
a display processing function of displaying, on a display unit, the flow line, action content information indicating a content of the action, and action location information indicating a location where the action is performed.

Advantageous Effects of Invention

According to the present invention, a motion of a person can be displayed on a display unit in a recognizable manner.

BRIEF DESCRIPTION OF THE DRAWINGS

The above-described object, other objects, features, and advantages will become more apparent from preferred example embodiments described below and the following accompanying drawings.

DESCRIPTION OF EMBODIMENTS

Hereinafter, example embodiments according to the present invention are described by using the accompanying drawings. Note that, in all drawings, a similar component is assigned with a similar reference sign, and description thereof is not repeated as appropriate.

First Example Embodiment

Figure 1:
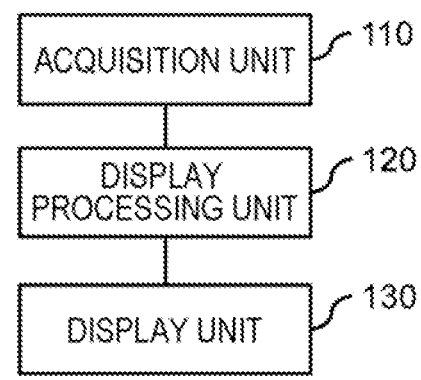
FIG. 1 is a diagram illustrating one example of a functional configuration of a flow line display apparatus according to a first example embodiment.

FIG. 1 is a diagram illustrating one example of a functional configuration of a flow line display apparatus 10 according to the present example embodiment. The flow line display apparatus 10 according to the present example embodiment includes an acquisition unit 110 and a display processing unit 120.

The acquisition unit 110 acquires at least one piece of flow line information. The flow line information includes a flow line of a person, and action information indicating an action performed when the person moves along the flow line and a location where the action is performed. The flow line information is generated with respect to each person.

Flow line information is generated, for example, by analyzing a video. The video is generated, for example, by a fixed camera such as a surveillance camera. Then, a video generated by the fixed camera is analyzed, and thereby, flow line information of a person having moved in a region included in an angle of view of the fixed camera is generated. Herein, a frame rate of an image constituting a video is optional.

When a video is analyzed, a flow line with respect to each person can be determined. Further, when a video is analyzed, an actin performed by the person in each location on a flow line can be also determined. Therefore, the above-described action information is also generated by analyzing a video. Herein, the "action" may be an action unrelated to with/without moving, i.e., an action being capable of performing even when being still or moving such as waving a hand, stretching out, and looking around (swinging his/her face laterally), or may be information relating to a movement state such as walking, running, brisk walking, coming to a standstill, sitting, and staggering. Further, the "action" may include both of information relating to a movement state and an action unrelated to with/without moving. One example of an "action" in this case is "waving a hand during walking".

Then, flow line information may include timing information indicating, as to at least one point on a flow line, a timing when the person was located at the point. The timing information includes, for example, a time, but may further include a month-day or a year-month-day. The flow line information preferably includes, with respect to every location and every action on a flow line, a timing at which the action is performed.

The display processing unit 120 displays, on a display unit 130, a flow line indicated by flow line information, action content information indicating a content of an action, and action location information indicating a location where the action is performed. Details of information displayed on the display unit 130 by the display processing unit 120 are described later.

Note that, flow line information may be generated by processing a video of each of a plurality of fixed cameras. As one example, when a region (hereinafter, referred to as a first region) included in an angle of view of a first fixed camera and a region (hereinafter, referred to as a second region) included in an angle of view of a second fixed camera are adjacent to each other, one piece of flow line information can indicate a flow line of a person and an action in a region connecting the first region to the second region when an analysis result of a video of the first fixed camera and an analysis result of a video of the second fixed camera are coordinated. Note that, the number of fixed cameras necessary for generating one piece of flow line information is not limited to one or two.

Further, when a plurality of persons are captured in one video, a plurality of pieces of flow line information are generated from one video. In this case, the display processing unit 120 may simultaneously display, on the display unit 130, pieces of flow line information relating to at least two of the plurality of persons, or may display, on the display unit 130, flow line information for only one person. In the former case, pieces of flow line information of a plurality of persons in the same time period are simultaneously displayed on the display unit 130, and therefore, a person who watches the display unit 130 can recognize how motions of the plurality of persons cause mutual influence among the motions.

Figure 2:
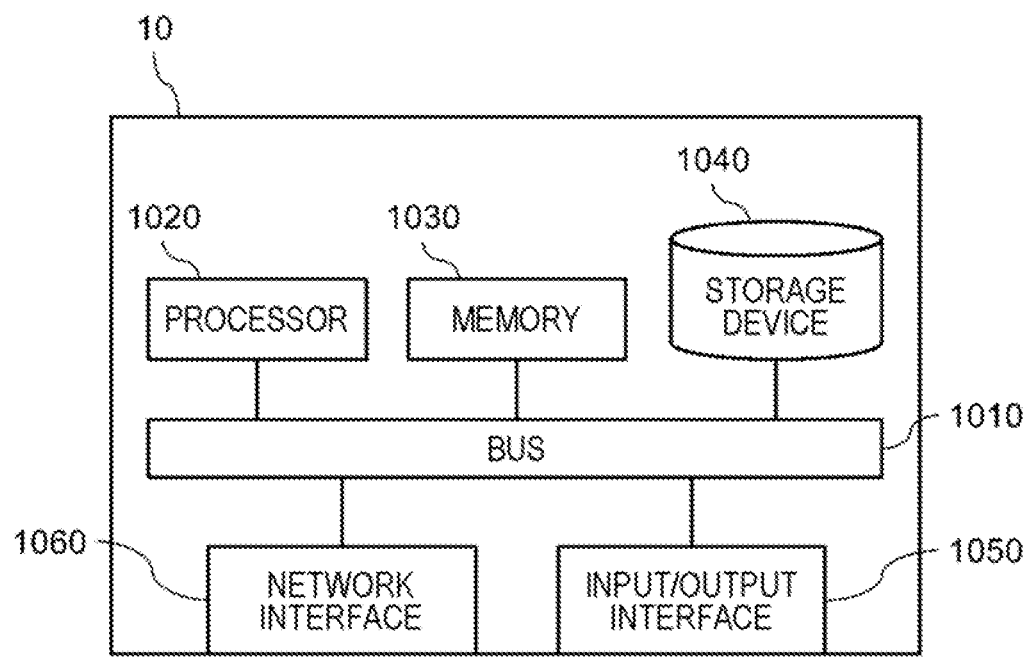
FIG. 2 is a diagram illustrating a hardware configuration example of the flow line display apparatus.

FIG. 2 is a diagram illustrating a hardware configuration example of the flow line display apparatus 10. The flow line display apparatus 10 includes a bus 1010, a processor 1020, a memory 1030, a storage device 1040, an input/output interface 1050, and a network interface 1060.

The bus 1010 is a data transmission path in which the processor 1020, the memory 1030, the storage device 1040, the input/output interface 1050, and the network interface 1060 mutually transmit/receive data. However, a method of mutually connecting the processor 1020 and the like is not limited to bus connection.

The processor 1020 is a processor achieved by a central processing unit (CPU), a graphics processing unit (GPU), or the like.

The memory 1030 is a main storage achieved by a random access memory (RAM) or the like.

The storage device 1040 is an auxiliary storage achieved by a hard disk drive (HDD), a solid state drive (SSD), a memory card, a read only memory (ROM), or the like. The storage device 1040 stores a program module achieving each function (e.g., the acquisition unit 110, the display processing unit 120, and the display unit 130) of the flow line display apparatus 10. The processor 1020 reads each of the program modules onto the memory 1030 and executes the read program module, and thereby each function relevant to the program module is achieved. Further, the storage device 1040 may also function as a flow line information storage unit 140 and a video storage unit 150 described according to example embodiments to be described.

The input/output interface 1050 is an interface for connecting the flow line display apparatus 10 to various types of input/output devices. When the flow line information storage unit 140 and the video storage unit 150 are located outside the flow line display apparatus 10, the flow line display apparatus 10 may be connected to the flow line information storage unit 140 and the video storage unit 150 via the input/output interface 1050.

The network interface 1060 is an interface for connecting the flow line display apparatus 10 to a network. The network is, for example, a local area network (LAN) or a wide area network (WAN). A method for connecting to a network based on the network interface 1060 may be wireless connection, or may be wired connection. When the flow line information storage unit 140 and the video storage unit 150 are located outside the flow line display apparatus 10, the flow line display apparatus 10 may be connected to the flow line information storage unit 140 and the video storage unit 150 via the network interface 1060.

Figure 3:
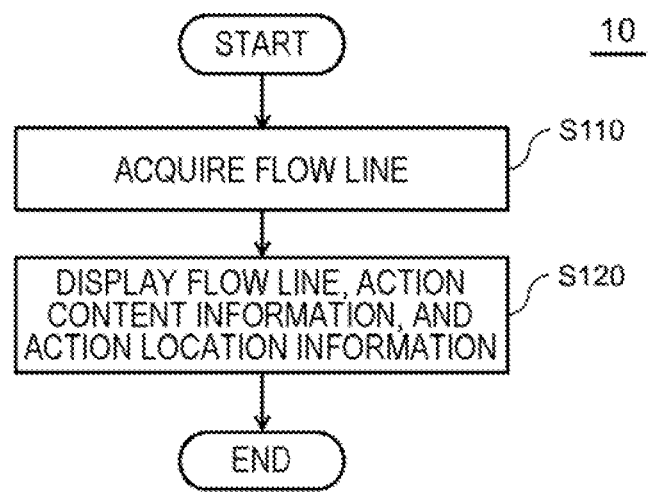
FIG. 3 is a flowchart illustrating one example of processing performed by the flow line display apparatus.

FIG. 3 is a flowchart illustrating one example of processing performed by the flow line display apparatus 10. First, the acquisition unit 110 acquires flow line information (step S110). Herein, the acquisition unit 110 may acquire one piece of flow line information, or may acquire a plurality of pieces of flow line information. In the latter case, each of a plurality of pieces of flow line information indicates a flow line in the same region and in the same time period.

Next, the display processing unit 120 generates, by using the flow line information acquired in step S110, screen information, and outputs the screen information to the display unit 130. Then, the display unit 130 displays a screen according to the screen information. The screen includes a flow line, action content information, and action location information (step S120).

Figure 4:
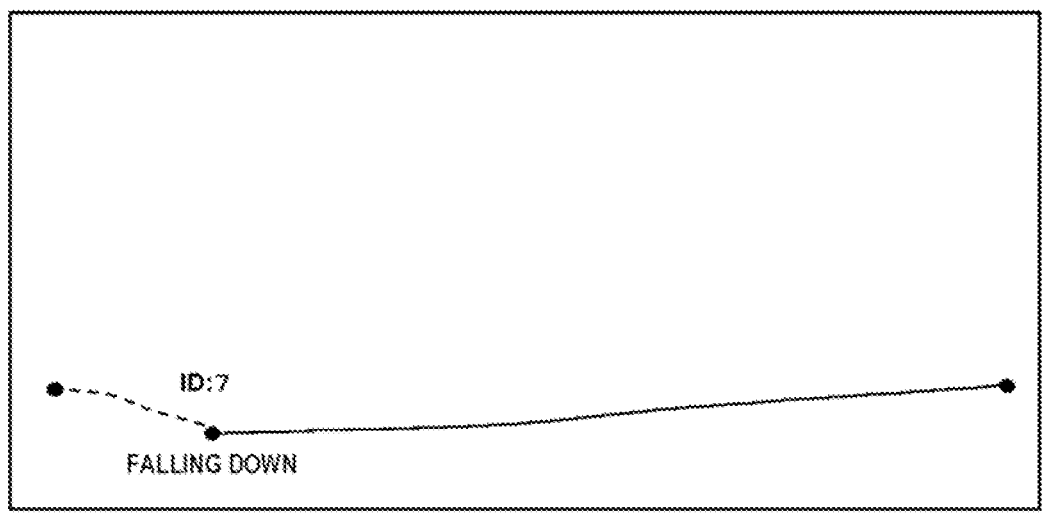
FIG. 4 illustrates a first example of a screen displayed in step S120 in FIG. 3.

FIG. 4 illustrates a first example of a screen displayed in step S120 in FIG. 3. In an example illustrated in the present figure, the display unit 130 displays, in a top view, a region where a person is moving. However, the display unit 130 may display a flow line by setting a point of view on an oblique upper side. A flow line is indicated with a line. Further, in the example illustrated in the present figure, the display unit 130 displays, in a vicinity of a flow line, an identifier (referred to as ID: 7 in the figure) of a person relevant to the flow line. However, the display unit 130 may not necessarily display the identifier.

Herein, a line indicating a flow line doubles as action content information. Specifically, a type of a line indicating a flow line is different, depending on an action of a person at a point indicated by the flow line, for example, an action associated with a movement of a person. A type of a line indicating a flow line is set, for example, by using movement velocity of a person in the flow line. As one example, a flow line during walking is indicated with a solid line, and a flow line during running is indicated with a dotted line. Herein, a type of a dotted line may be different according to a speed during running. Note that, a type of a line may be a solid line, a dotted line, or a dashed-dotted line, and may further be changed according to a width or a color of a line.

Further, in the example illustrated in the present figure, at least one piece of action content information indicating a certain action is a mark or a character. Specifically, the display unit 130 displays, with respect to an action being not associated with a movement of a person, such as "falling down", a mark or a character indicating the action, in a location where the action is performed or in a vicinity of the location.

Figure 5:
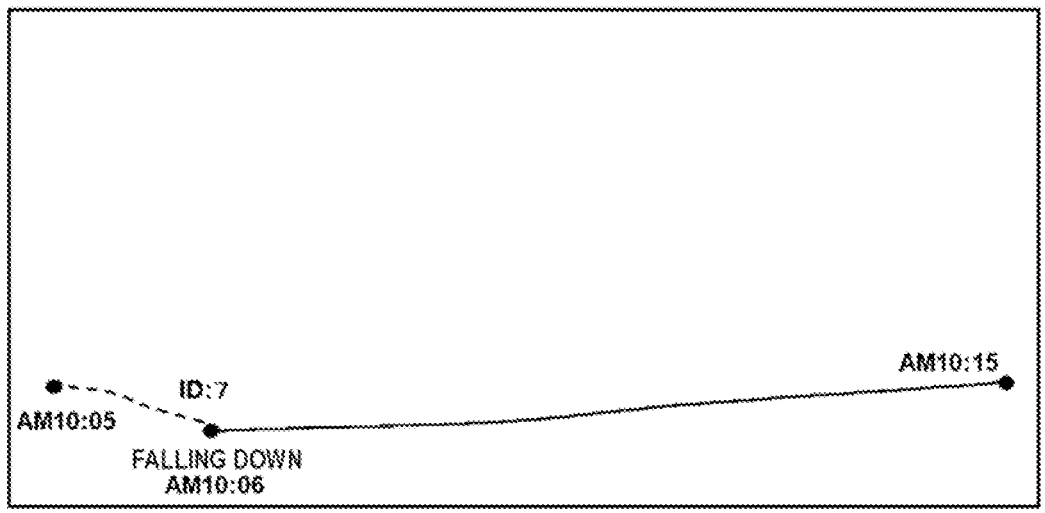
FIG. 5 illustrates a second example of a screen displayed in step S120 in FIG. 3.

FIG. 5 illustrates a second example of a screen displayed in step S120 in FIG. 3. In the example illustrated in the present figure, the display unit 130 displays information illustrated in FIG. 4, and further displays timing information indicating a timing at which each action is performed. As one example, the display unit 130 also displays, in a vicinity of a mark or a character indicating a certain action, timing information of the action. In the example illustrated in the present figure, timing information is a time. However, as described above, timing information may further include a month-day or a year-month-day.

Figure 6:
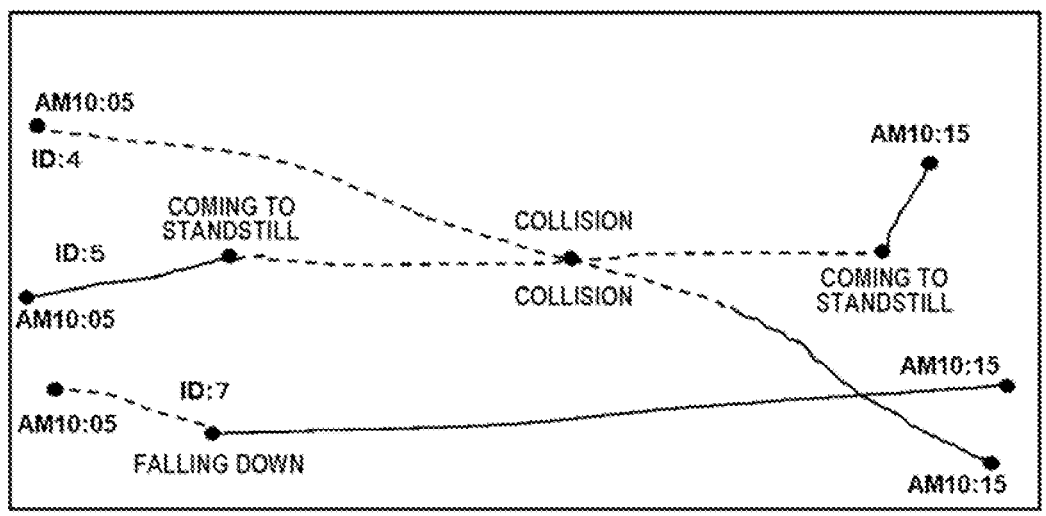
FIG. 6 illustrates a third example of a screen displayed in step S120 in FIG. 3.

FIG. 6 illustrates a third example of a screen displayed in step S120 in FIG. 3. In the example illustrated in FIG. 4, the display unit 130 displays a flow line of one person, action content information, and action location information. In contrast, in the example illustrated in the present figure, the display unit 130 displays a flow line, action content information and action location information for each of a plurality of persons. By doing so, a person who watches the display unit 130 can recognize how motions of a plurality of persons cause mutual influence among the motions (e.g., who collides with whom, or the like).

Further, in the example illustrated in the present figure, the display unit 130 displays, in a vicinity of each flow line, identifiers (referred to as ID: 4, ID: 5, and ID: 7 in the figure) of persons relevant to each flow line. By doing so, a person who watches the display unit 130 can recognize, with respect to each of a plurality of flow lines, a person having performed a motion indicated in the flow line.

As described above, according to the present example embodiment, the display processing unit 120 displays, on the display unit 130, action content information indicating an action performed when the person moves along the flow line and an action location indicating a location where the action is performed together with a flow line of a person. Therefore, a motion of a person is displayed in a recognizable manner.

Second Example Embodiment

A flow line display apparatus 10 according to the present example embodiment is similar to the flow line display apparatus 10 according to the first example embodiment except that, from among a plurality of pieces of flow line information acquired by an acquisition unit 110, a flow line indicated by flow line information of a person selected by a user, action content information, and action location information is displayed on a display unit 130, but a flow line indicated by flow line information of another person, action content information, or action location information is not displayed on the display unit 130.

Figure 7:
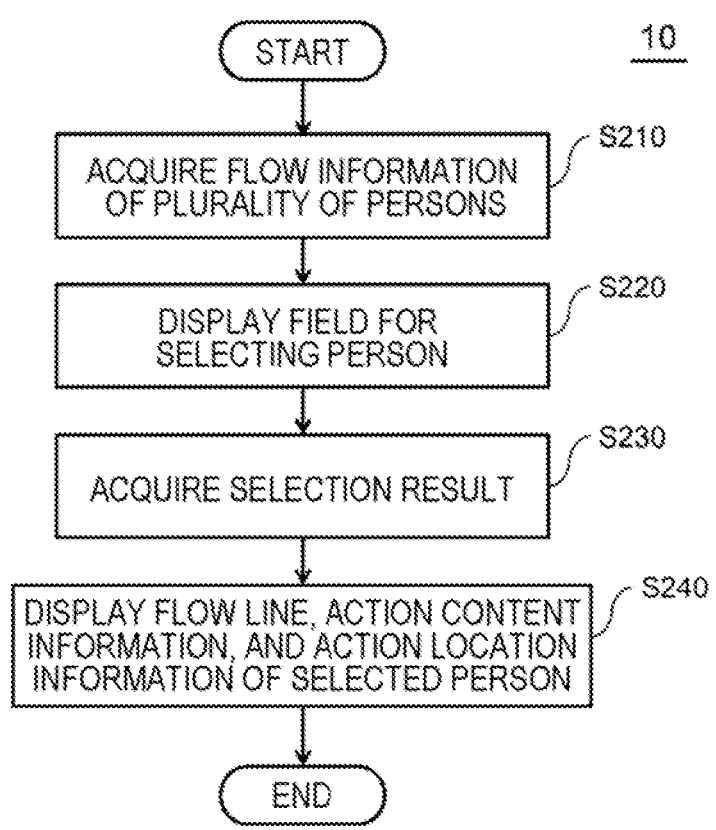
FIG. 7 is a flowchart illustrating one example of processing performed by a flow line display apparatus according to a second example embodiment.

FIG. 7 is a flowchart illustrating one example of processing performed by the flow line display apparatus 10 according to the present example embodiment. First, the acquisition unit 110 acquires a plurality of pieces of flow line information. The plurality of pieces of flow line information indicate flow lines of persons different from each other (step S210). Then, a display processing unit 120 displays, on the display unit 130, a screen for selecting at least one person from among the plurality of persons (step S220). Details of the screen are described later.

A user of the flow line display apparatus 10 looks at the display unit 130, and enters input to select a person whose flow line is to be confirmed. The display processing unit 120 acquires information indicating a selection result, i.e., information determining a person selected by the user (step S230). Next, the display processing unit 120 selects flow line information of the person selected by the user, and displays, on the display unit 130, a flow line indicated by the selected flow line information, action content information, and action location information. Herein, the display processing unit 120 does not display, on the display unit 130, a flow line indicated by flow line information of another person, action content information, and action location information (step S240).

Figure 8:
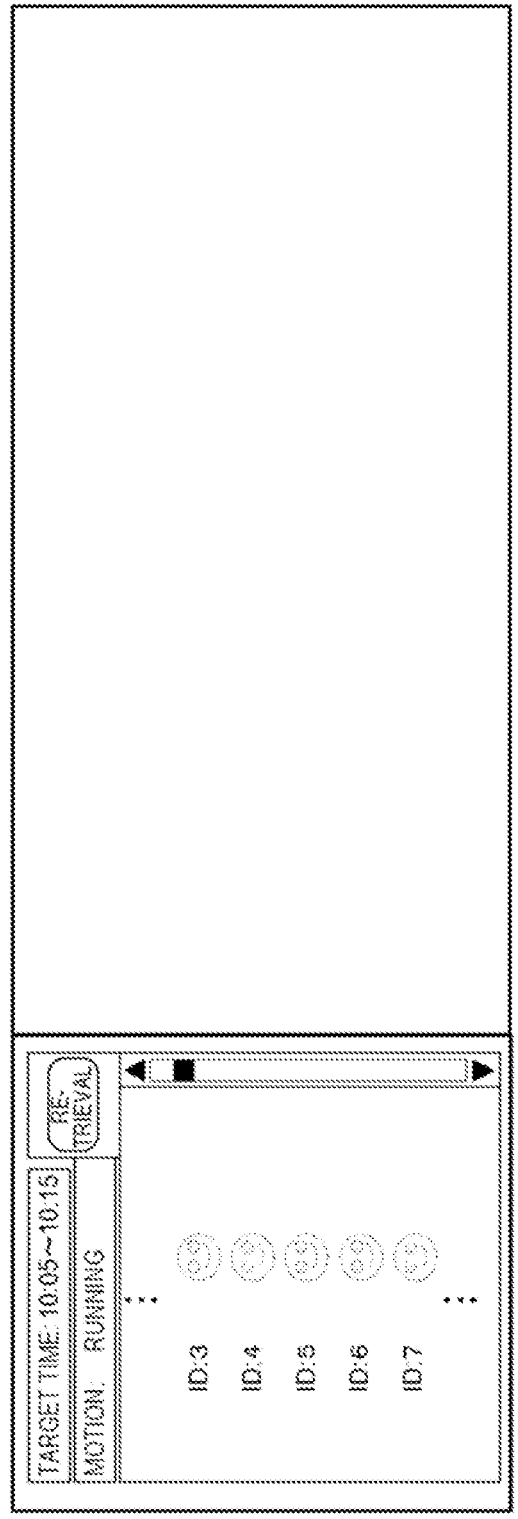
FIG. 8 illustrates one example of a screen displayed by a display unit in step S220 in FIG. 7.

FIG. 8 illustrates one example of a screen displayed by the display unit 130 in step S220 in FIG. 7. In the example illustrated in the present figure, a field on a left side of the screen is a field for selecting a person by a user, and a field on a right side of the screen is a field for displaying a flow line, action content information, and action location information of the selected person.

The display unit 130 displays, with respect to each piece of flow line information, an image including a person relevant to the flow line information in the field on the left side as information for selecting a person. The image is, for example, an image trimmed from a frame image generated by a camera, and is acquired by the acquisition unit 110 in step S210, together with flow line information. Then, when a user selects the image (for example, clicks a mouse in a state where a cursor is over the image), a person relevant to the image is selected.

Figure 9:
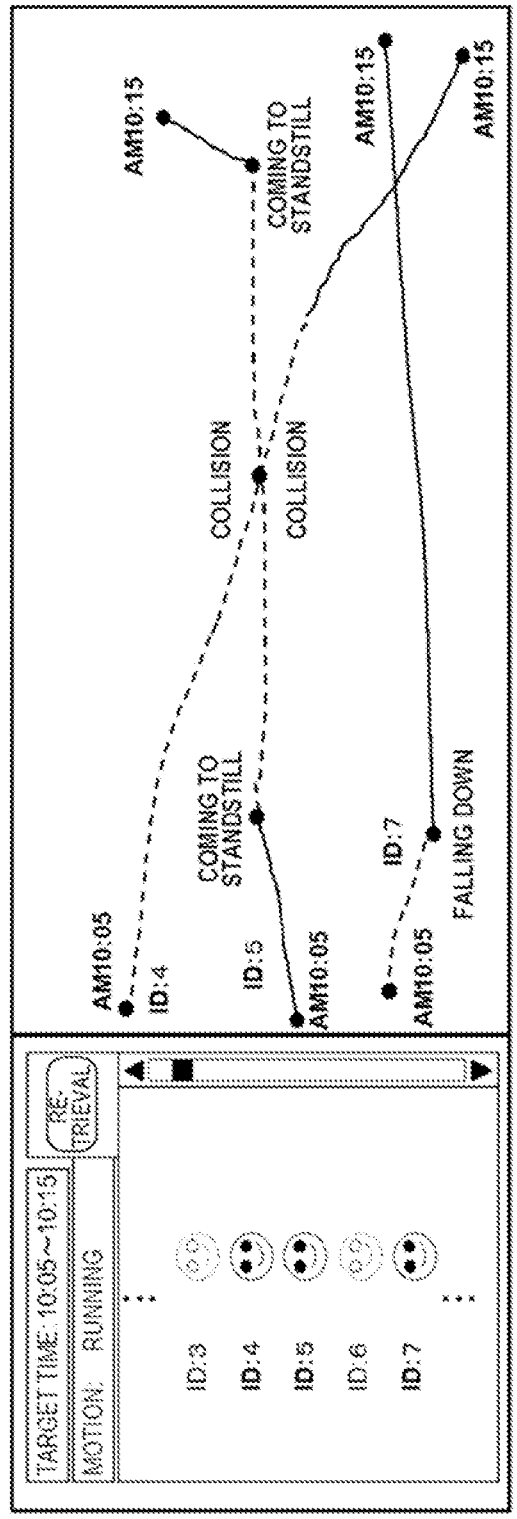
FIG. 9 illustrates one example of a screen displayed by the display unit in step S240 in FIG. 7.

FIG. 9 illustrates one example of a screen displayed by the display unit 130 in step S240 in FIG. 7. In a field on a left side, an image of a person selected by a user can be discriminated from an image of a remaining person. As one example, an image of a person having not been selected by a user becomes paler than an image selected by a user. Further, in a field on a right side, a flow line of a person selected by a user is displayed together with action content information and action location information, but a flow line, action content information, and action location information of a remaining person is not displayed.

Note that, after step S240, steps S220 to S240 may be performed again.

Further, in step S240 in FIG. 7, the display processing unit 120 may display, on the display unit 130, a flow line indicated by flow line information of a person selected by a user, action content information, and action location information, and may also display, on the display unit 130, a flow line indicated by flow line information of another person, action content information, and action location information. In this case, the display processing unit 120 displays, on the display unit 130, a flow line indicated by flow line information of a person selected by a user, action content information, and action location information in a state of being discriminable (e.g., a color is changed, or the like) from a flow line indicated by flow line information of another person, action content information, and action location information.

Also, according to the present example embodiment, a motion of a person is displayed in a recognizable manner, similarly to the first example embodiment. Further, according to the present example embodiment, even when the acquisition unit 110 acquires pieces of flow line information of a plurality of persons, a flow line of a person undesired by a user is not displayed on the display unit 130.

Therefore, a motion of a person is recognizable.

Third Example Embodiment

A flow line display apparatus 10 according to the present example embodiment acquires, from a user, a condition (hereinafter, referred to as a selection condition) to be satisfied by flow line information, and acquires flow line information satisfying the selection condition.

Figure 10:
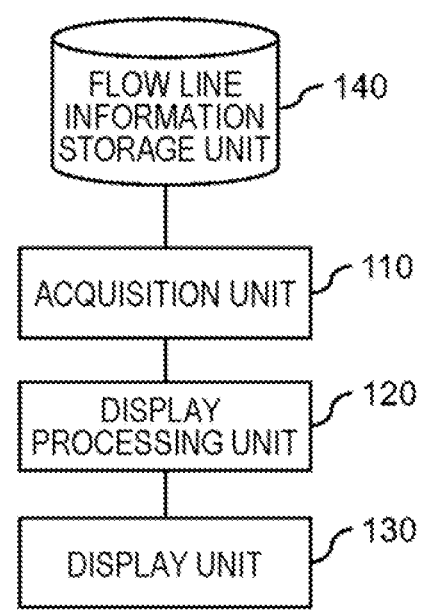
FIG. 10 is a diagram illustrating one example of a functional configuration of a flow line display apparatus according to a third example embodiment.

FIG. 10 is a diagram illustrating one example of a functional configuration of the flow line display apparatus 10 according to the present example embodiment. The flow line display apparatus 10 illustrated in the present figure is similar to either of the above-described example embodiments except that an acquisition unit 110 acquires the above-described selection condition and acquires, from a flow line information storage unit 140, flow line information satisfying the selection condition.

The flow line information storage unit 140 stores flow line information, for example, in association with a time and date and a location (or identification information of a camera that generates a video) in which a video relevant to the flow line information is generated. Then, one example of a selection condition acquired by the acquisition unit 110 is a combination of a location and a time and date. In this case, a display processing unit 120 displays, on a display unit 130, a flow line of a person at a certain location and in a certain time period.

Note that, a selection condition may include an action included in flow line information. In this case, the display processing unit 120 displays, on the display unit 130, only a flow line of a person having performed a specific action (e.g., running, looking around, or the like) at a certain location and in a certain time period. Further, a selection condition may include a plurality of actions and an order of the plurality of actions. In this case, the display processing unit 120 displays, on the display unit 130, a flow line of a person having performed a plurality of actions in a specified order. As one example, the display processing unit 120 displays, on the display unit 130, a flow line of a person who "walks, falls down, and stands up".

Note that, the flow line information storage unit 140 stores, with respect to each person ID, for example, an identifier of a camera that generates a video in which the person is captured, an identifier (or a time and date) of a frame image in which the person is captured, and a location and an action (e.g., a behavior feature value) of the person in the frame image. However, a structure of data stored by the flow line information storage unit 140 is not limited to this example.

Figure 11:
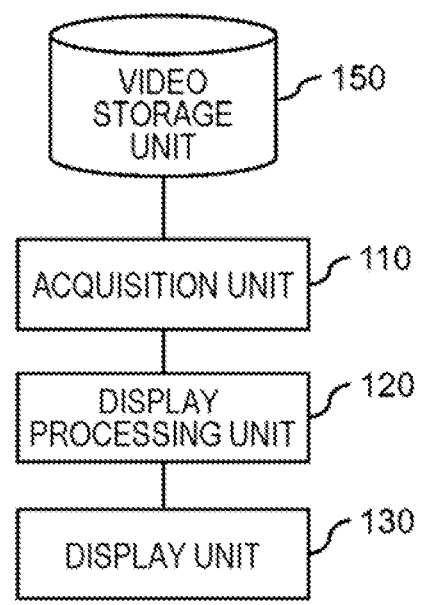
FIG. 11 is a diagram illustrating one example of a modified example in FIG. 10.

FIG. 11 is a diagram illustrating one example of a modified example of FIG. 10. In the flow line display apparatus 10 illustrated in the present figure, the acquisition unit 110 acquires information from a vide storage unit 150, instead of the flow line information storage unit 140. The video storage unit 150 stores a video generated by a camera in association with information (e.g., an identifier of a camera) capable of determining a location where the camera is installed. Note that, the video also includes information indicating a time and date when each frame image is generated.

Then, the acquisition unit 110 acquires, when acquiring the above-described selection condition, from the video storage unit 150, a video satisfying a location and a time and date included in the selection condition. Then, the acquisition unit 110 processes the video, and thereby, generates the above-described flow line information. Then, the acquisition unit 110 selects, when an "action" is included in the selection condition, a piece of flow line information satisfying the "action" as a selection condition, from among pieces of the generated flow line information.

Also, according to the present example embodiment, similarly to the first example embodiment, a motion of a person is displayed in a recognizable manner. Further, the flow line display apparatus 10 can display, on the display unit 130, a flow line of a person under a condition (e.g., a location and a time and date) desired by a user.

As described above, with reference to the accompanying drawings, example embodiments according to the present invention have been described, but these example embodiments are exemplification of the present invention, and various configurations other than the above-described configurations are employable.

For example, according to the third example embodiment or the modified example thereof, the display processing unit 120 may aggregate, with respect to each action, locations where the action (e.g., falling down, running, or the like) is performed, and determine a location where the action tends to be performed. In this case, the display processing unit 120 may display, on the display unit 130, the number of cases where the action is performed, with respect to each location.

Further, according to each of the example embodiments described above, the display processing unit 120 may display, instead of a flow line, a pose change timeline. One example of the pose change timeline is to designate a horizontal axis as a time axis and then display a mark or a character indicating that each action is performed at a location relevant to a time at which the action is performed.

Further, although a plurality of steps (pieces of processing) are described in order in a plurality of flowcharts used in the above description, an execution order of steps executed in each example embodiment is not limited to the described order. In each example embodiment, an order of illustrated steps can be changed to an extent that causes no problem in terms of content. Moreover, each example embodiment described above can be combined as far as contents do not contradict.

A part or whole of the example embodiments described above can be described as, but not limited to, the following supplementary notes.

1. A flow line display apparatus including:
    an acquisition unit that acquires a flow line of a person, and flow line information including action information indicating an action performed when the person moves along the flow line and a location where the action is performed; and
    a display control unit that displays, on a display unit, the flow line, action content information indicating a content of the action, and action location information indicating a location where the action is performed.
2. The flow line display apparatus according to supplementary note 1, wherein
    at least one of pieces of the action content information is a mark or a character.
3. The flow line display apparatus according to supplementary note 2, wherein
    the mark or the character is displayed in a location where the action is performed in the flow line or in a vicinity of the location, and thereby doubles as the action location information.
4. The flow line display apparatus according to any one of supplementary notes 1 to 3, wherein
    at least one of pieces of the action content information is a line indicating the flow line, and indicates the action by using a type of the line.
5. The flow line display apparatus according to supplementary note 4, wherein
    a type of the line is set by using movement velocity of the person in the flow line.
6. The flow line display apparatus according to any one of supplementary notes 1 to 5, wherein
    the flow line information includes timing information indicating a timing at which the action is performed, and
    the display control unit also displays, on the display unit, a timing indicated by the timing information.
7. The flow line display apparatus according to any one of supplementary notes 1 to 6, wherein
    the acquisition unit acquires the flow line information of each of a plurality of the persons, and
    the display control unit displays, on the display unit, the flow line, the action content information, and the action location information for each of the plurality of persons.
8. The flow line display apparatus according to supplementary note 7, wherein
    the display control unit
        displays, on the display unit, selection display for causing a user to select at least one person from among the plurality of persons, and
        acquires information determining the person selected by the user in the selection display,
        displays, on the display unit, the flow line, the action content information, and the action location information of the person, and
        does not display, on the display unit, the flow line, the action content information, and the action location information of another person.
9. The flow line display apparatus according to supplementary note 7, wherein
    the display control unit
        displays, on the display unit, selection display for causing a user to select at least one person from among of the plurality of persons, and
        acquires information determining the person selected by the user in the selection display and
        displays, on the display unit, the flow line, the action content information, and the action location information of the person in a state of being discriminable from the flow line, the action content information, and the action location information of another person.
10. The flow line display apparatus according to any one of supplementary notes 1 to 9, wherein
    the acquisition unit
        acquires a selection condition being a condition to be satisfied by the flow line information to be acquired by the acquisition unit, and
        acquires the flow line information satisfying the selection condition from a storage unit that stores pieces of the flow line information of a plurality of the persons.
11. The flow line display apparatus according to supplementary note 10, wherein
    the selection condition relates to the action.
12. The flow line display apparatus according to supplementary note 11, wherein
    the selection condition includes a plurality of the actions and an order of the plurality of actions.
13. A flow line display method including,
    by a computer to execute:
        acquisition processing of acquiring a flow line of a person, and flow line information including action information indicating an action performed when the person moves along the flow line and a location where the action is performed; and
        display processing of displaying, on a display unit, the flow line, action content information indicating a content of the action, and action location information indicating a location where the action is performed.

14. The flow line display method according to supplementary note 13, wherein
at least one of pieces of the action content information is a mark or a character.
15. The flow line display method according to supplementary note 14, wherein
the mark or the character is displayed in a location where the action is performed in the flow line or in a vicinity of the location, and thereby doubles as the action location information.
16. The flow line display method according to any one of supplementary notes 13 to 15, wherein
at least one of pieces of the action content information is a line indicating the flow line, and indicates the action by using a type of the line.
17. The flow line display method according to supplementary note 16, wherein
a type of the line is set by using movement velocity of the person in the flow line.
18. The flow line display method according to any one of supplementary notes 13 to 17, wherein
the flow line information includes timing information indicating a timing at which the action is performed, the flow line display method further including,
by the computer,
in the display control processing, also displaying, on the display unit, a timing indicated by the timing information.
19. The flow line display method according to any one of supplementary notes 13 to 18, further including,
by the computer:
in the acquisition processing, acquiring the flow line information of each of a plurality of the persons; and,
in the display control processing, displaying, on the display unit, the flow line, the action content information, and the action location information for each of the plurality of persons.
20. The flow line display method according to supplementary note 19, further including,
by the computer:
in the display control processing,
displaying, on the display unit, selection display for causing a user to select at least one person from among the plurality of persons; and
acquiring information determining the person selected by the user in the selection display,
displaying, on the display unit, the flow line, the action content information, and the action location information of the person, and
not displaying, on the display unit, the flow line, the action content information, and the action location information of another person.
21. The flow line display method according to supplementary note 19, further including,
by the computer:
in the display control processing,
displaying, on the display unit, selection display for causing a user to select at least one person from among the plurality of persons; and
acquiring information determining the person selected by the user in the selection display, and
displaying, on the display unit, the flow line, the action content information, and the action location information of the person in a state of being discriminable from the flow line, the action content information, and the action location information of another person.

22. The flow line display method according to any one of supplementary notes 13 to 21, further including,
by the computer:
in the acquisition processing,
acquiring a selection condition being a condition to be satisfied by the flow line information to be acquired by the acquisition unit; and
acquiring the flow line information satisfying the selection condition from a storage unit that stores pieces of the flow line information of a plurality of the persons.
23. The flow line display method according to supplementary note 22, wherein
the selection condition relates to the action.
24. The flow line display method according to supplementary note 23, wherein
the selection condition includes a plurality of the actions and an order of the plurality of actions.
25. A program causing a computer to include:
an acquisition function of acquiring a flow line of a person, and flow line information including action information indicating an action performed when the person moves along the flow line and a location where the action is performed; and
a display processing function of displaying, on a display unit, the flow line, action content information indicating a content of the action, and action location information indicating a location where the action is performed.
26. The program according to supplementary note 25, wherein
at least one of pieces of the action content information is a mark or a character.
27. The program according to supplementary note 26, wherein
the mark or the character is displayed in a location where the action is performed in the flow line or in a vicinity of the location, and thereby doubles as the action location information.
28. The program according to any one of supplementary notes 25 to 27, wherein
at least one of pieces of the action content information is a line indicating the flow line, and indicates the action by using a type of the line.
29. The program according to supplementary note 28, wherein
a type of the line is set by using movement velocity of the person in the flow line.
30. The program according to any one of supplementary notes 25 to 29, wherein
the flow line information includes timing information indicating a timing at which the action is performed, and
the display control function also displays, on the display unit, a timing indicated by the timing information.
31. The program according to any one of supplementary notes 25 to 30, wherein
the acquisition function acquires the flow line information of each of a plurality of the persons, and
the display control function displays, on the display unit, the flow line, the action content information, and the action location information for each of the plurality of persons.

32. The program according to supplementary note 31, wherein
the display control function
displays, on the display unit, selection display for causing a user to select at least one person from among the plurality of persons, and
acquires information determining the person selected by the user in the selection display,
displays, on the display unit, the flow line, the action content information, and the action location information of the person, and
does not display, on the display unit, the flow line, the action content information, and the action location information of another person.

33. The program according to supplementary note 31, wherein
the display control function
displays, on the display unit, selection display for causing a user to select at least one person from among the plurality of persons, and
acquires information determining the person selected by the user in the selection display and
displays, on the display unit, the flow line, the action content information, and the action location information of the person in a state of being discriminable from the flow line, the action content information, and the action location information of another person.

34. The program according to any one of supplementary notes 25 to 33, wherein
the acquisition function
acquires a selection condition being a condition to be satisfied by the flow line information to be acquired by the acquisition unit, and
acquires the flow line information satisfying the selection condition from a storage unit that stores pieces of the flow line information of a plurality of the persons.

35. The program according to supplementary note 34, wherein
the selection condition relates to the action.

36. The program according to supplementary note 35, wherein
the selection condition includes a plurality of the actions and an order of the plurality of actions.

REFERENCE SIGNS LIST

100 Flow line display apparatus
110 Acquisition unit
120 Display processing unit
130 Display unit
140 Flow line information storage unit
150 Video storage unit

What is claimed is:

1. A flow line display apparatus comprising:
at least one memory storing instructions; and
at least one processor configured to execute the instructions to perform operations comprising:
acquiring, for each of a plurality of persons, a flow line of the person, and flow line information including action information indicating an action performed when the person moves along the flow line and a location where the action is performed;
displaying, on a display and for each of the plurality of persons, the flow line, action content information indicating a content of the action, and action location information indicating a location where the action is performed;
displaying, on the display, selection display for causing a user to select at least one person from among the plurality of persons;
acquiring information determining the person selected by the user in the selection display; and
displaying, on the display, the flow line, the action content information, and the action location information of the person selected by the user in a state of being discriminable from the flow line, the action content information, and the action location information of another person.

2. The flow line display apparatus according to claim 1, wherein
at least one of pieces of the action content information is a mark or a character.

3. The flow line display apparatus according to claim 2, wherein
the mark or the character is displayed in a location where the action is performed in the flow line or in a vicinity of the location, and thereby doubles as the action location information.

4. The flow line display apparatus according to claim 1, wherein
at least one of pieces of the action content information is a line indicating the flow line, and indicates the action by using a type of the line.

5. The flow line display apparatus according to claim 4, wherein
For each of the plurality of persons, a type of the line is set by using movement velocity of the person in the flow line.

6. The flow line display apparatus according to claim 1, wherein
the flow line information includes timing information indicating a timing at which the action is performed, and
the operations further comprise displaying, on the display, a timing indicated by the timing information.

7. The flow line display apparatus according to claim 1, wherein the operations further comprise:
displaying, on the display, selection display for causing the user to select at least one person from among the plurality of persons;
acquiring information determining the at least one person selected by the user in the selection display;
displaying, on the display, the flow line, the action content information, and the action location information of the at least one person selected by the user; and
not displaying, on the display, the flow line, the action content information, and the action location information of another person.

8. The flow line display apparatus according to claim 1, wherein the operations further comprise:
acquiring a selection condition to be satisfied by the flow line information to be acquired; and
acquiring the flow line information satisfying the selection condition from a storage that stores pieces of the flow line information of the plurality of persons.

9. The flow line display apparatus according to claim 8, wherein
the selection condition relates to the action.

10. The flow line display apparatus according to claim 9, wherein the selection condition includes a plurality of actions including the action and an order of the plurality of actions.

11. A flow line display method performed by a computer and comprising:

acquiring, for each of a plurality of persons, a flow line of the person, and flow line information including action information indicating an action performed when the person moves along the flow line and a location where the action is performed;

displaying, on a display and for each of the plurality of persons, the flow line, action content information indicating a content of the action, and action location information indicating a location where the action is performed;

displaying, on the display, selection display for causing a user to select at least one person from among the plurality of persons;

acquiring information determining the person selected by the user in the selection display; and displaying, on the display, the flow line, the action content information, and the action location information of the person selected by the user in a state of being discriminable from the flow line, the action content information, and the action location information of another person.

12. A non-transitory computer-readable medium storing a program executable by a computer to perform operations comprising:

acquiring, for each of a plurality of persons, a flow line of the person, and flow line information including action information indicating an action performed when the person moves along the flow line and a location where the action is performed;

displaying, on a display and for each of the plurality of persons, the flow line, action content information indicating a content of the action, and action location information indicating a location where the action is performed;

displaying, on the display, selection display for causing a user to select at least one person from among the plurality of persons;

acquiring information determining the person selected by the user in the selection display; and displaying, on the display, the flow line, the action content information, and the action location information of the person selected by the user in a state of being discriminable from the flow line, the action content information, and the action location information of another person.

13. The flow line display method according to claims 11, further comprising:

acquiring a selection condition to be satisfied by the flow line information to be acquired; and acquiring the flow line information satisfying the selection condition from a storage that stores pieces of the flow line information of the plurality of persons.

14. The flow line display method according to claim 13, wherein the selection condition relates to the action.

15. The flow line display method according to claim 14, wherein the selection condition includes a plurality of actions including the action and an order of the plurality of actions.

16. The non-transitory computer-readable medium according to claim 12, wherein the operations further comprise:

acquiring a selection condition to be satisfied by the flow line information to be acquired; and acquiring the flow line information satisfying the selection condition from a storage that stores pieces of the flow line information of the plurality of persons.

17. The non-transitory computer-readable medium according to claim 16, wherein the selection condition relates to the action.

18. The non-transitory computer-readable medium according to claim 17, wherein the selection condition includes a plurality of actions including the action and an order of the plurality of actions.

* * * * *